United States Patent
Arlaban Gabeiras et al.

(10) Patent No.: US 9,169,831 B2
(45) Date of Patent: Oct. 27, 2015

(54) MOULD FOR PRECAST CONCRETE ELEMENT PRODUCTION

(71) Applicant: ACCIONA WINDPOWER, S.A., Barasoain, Navarra (ES)

(72) Inventors: Teresa Arlaban Gabeiras, Navarra (ES); Jose Miguel Garcia Sayes, Navarra (ES); Miguel Nunez Polo, Navarra (ES); Alfonso Ruiz Aldama, Navarra (ES); Jose Luis Aristegui Lantero, Navarra (ES); Ivan Garcia Maestre, Navarra (ES)

(73) Assignee: Acciona Windpower, S.A., Barasoain (Navarra) (ES)

( * ) Notice: Subject to any disclaimer, the term of this patent is extended or adjusted under 35 U.S.C. 154(b) by 0 days.

(21) Appl. No.: 14/142,667

(22) Filed: Dec. 27, 2013

(65) Prior Publication Data

US 2014/0182240 A1 Jul. 3, 2014

(30) Foreign Application Priority Data

Dec. 27, 2012 (ES) .................................. 201232051

(51) Int. Cl.
*B29D 99/00* (2010.01)
*F03D 11/04* (2006.01)
*B28B 7/02* (2006.01)

(52) U.S. Cl.
CPC ................ *F03D 11/045* (2013.01); *B28B 7/02* (2013.01); *B29D 99/001* (2013.01); *Y10T 428/1317* (2015.01)

(58) Field of Classification Search
CPC .................................. B28B 7/02; B28B 9/001
USPC ......... 249/137, 139, 154, 155, 157, 159, 160, 249/163–165, 168, 169, 209, 213, 214
See application file for complete search history.

(56) References Cited

U.S. PATENT DOCUMENTS

| | | | | |
|---|---|---|---|---|
| 884,931 | A * | 4/1908 | Keogan .......................... | 249/137 |
| 1,274,252 | A * | 7/1918 | Eid ................................ | 249/101 |
| 1,327,006 | A * | 1/1920 | Zinn .............................. | 249/99 |
| 2,505,342 | A * | 4/1950 | Schaaf .......................... | 249/160 |
| 3,703,271 | A * | 11/1972 | Kamb et al. .................... | 249/34 |
| 3,801,059 | A * | 4/1974 | Lippold ........................ | 249/134 |
| 4,181,287 | A * | 1/1980 | Richter et al. ................. | 249/154 |
| 4,637,586 | A * | 1/1987 | Fastenau ....................... | 249/159 |
| 4,814,126 | A * | 3/1989 | Krueger ........................ | 264/45.1 |
| 2004/0026601 | A1 * | 2/2004 | Hamilton et al. ............. | 249/175 |
| 2011/0020131 | A1 * | 1/2011 | Petersen et al. ............... | 416/226 |
| 2014/0287084 | A1 * | 9/2014 | Petersen et al. ............. | 425/451.9 |

FOREIGN PATENT DOCUMENTS

| | | | | |
|---|---|---|---|---|
| JP | 02016006 A | * | 1/1990 | ................ B28B 7/02 |
| WO | 2011157659 A1 | | 12/2011 | |
| WO | WO 2013056715 A1 | * | 4/2013 | .............. B29C 33/30 |

* cited by examiner

*Primary Examiner* — James Sanders
(74) *Attorney, Agent, or Firm* — McNees Wallace & Nurick LLC

(57) ABSTRACT

The present invention can be included in the technical field of moulds for precast concrete element production and relates to a mould for precast concrete element production wherein the relative position of the side walls that define the upper and lower flanks of the precast concrete element is defined by elements that are independent from the rest of the mould, as well as to the manufacturing process that uses the aforementioned mould for precast concrete element production, the precast concrete element thus obtained and a wind turbine comprising, in turn, at least one precast concrete element produced using said mould.

17 Claims, 3 Drawing Sheets

MOULD FOR PRECAST CONCRETE ELEMENT PRODUCTION

OBJECT OF THE INVENTION

The present invention can be included in the technical field of moulds for precast concrete element production.

The object of the invention relates to a mould for precast concrete element production wherein the relative position of the side walls that define the upper and lower flanks of the precast concrete element are defined by elements independent from the rest of the mould.

Likewise, another object of the invention is the manufacturing process that uses the aforementioned mould for precast concrete element production, the precast concrete element obtained by means of the aforementioned manufacturing process and the wind turbine that comprises at least one precast concrete element obtained by means of the aforementioned manufacturing process.

BACKGROUND OF THE INVENTION

The use of renewable energy sources for electricity production is known in the state of the art, among which wind energy is one of the most efficient. Wind energy enables production of electricity from wind by means of wind turbines. Said wind turbines consist basically of a tower, a nacelle that houses the electric generator and a rotor formed of at least one blade. The wind generator tower supports the nacelle and the rotor. In the case of large wind turbines, the towers may be manufactured from steel, lattice, reinforced concrete or a combination thereof, the latter comprising sections of different materials, for example, a lower section of concrete and an upper section of steel or lattice.

In the last twenty years the nominal power of wind turbines has gradually increased due to the increase in diameter of the rotor thereof, which in turn makes the use of taller towers essential. The increase in height can make it essential for the tower to comprise various sections therethrough which are disposed one on top of the other to form the tower and which in turn can be transported by road or rail. For example, in order to mount a 100-meter tower, five 20-meter tall stackable sections could be used, said dimensions allowing transport thereof by road and rail.

Further, in order to ensure that, while being taller, the towers are equally stable and rigid, one of the options is to increase the tower's transverse dimensions gradually from the top to the base. Said increase could imply new problems for transporting the sections and the usual solution consists of dividing them into longitudinal modules or dowels. The dimensions of the longitudinal modules enable transport thereof by road or rail.

The precision and quality of the dowels, particularly of the upper and lower flanks, determine section stacking precision and therefore tower verticality. In order to solve the stacking problems associated with lack of precision, flatness and parallelism of the sections flanks, the upper section is aligned over the lower section maintaining a space therebetween, in order to subsequently use a joining and filling material that absorbs the deviations with respect to the nominal value of the two sections. In general, the joining material is wet and requires curing time to eliminate the wetness, in such a manner that the joint acquires the adequate mechanical properties. This is known as "wet joint", where the application of the joining material requires the assembly of formwork around the joint.

In the concrete tower assembly process, when the tower sections lack the required precision, as mentioned earlier, a joining material that absorbs the imperfections of both sections, particularly those of the bond flanks, must be used. This requires a long and expensive process. Said process comprises the following steps:

Disposing a section on the part of the tower already assembled, leaving a space between the two adjacent sections.

Aligning the section with the rest of the tower, maintaining the separation.

Assembling formwork throughout the joining area between sections.

Pouring the joining material or mortar.

Waiting for the joining material to cure and disassemble the formwork.

As can be observed, the tower assembly process using this method is long and costly.

An alternative to this assembly process is the joint known as "dry joint", which only comprises the steps of stacking sections and applying the joining means therebetween (bolts, post-tension cables . . . ), significantly simplifying and reducing tower assembly time.

In concrete tower assembly using the dry joint method, the transverse surfaces (upper and lower flanks) of adjacent sections that come into contact must have a flatness and finish such as to guarantee the correct contact therebetween and, therefore, adequate transmission of stresses between sections. It is also fundamental that the upper and lower flanks of each tower section, in addition to being parallel therebetween, are also perpendicular to the axis of the section, as this aspect determines the verticality of the tower once assembled.

In butt joints of this kind, very precise tolerances and surface finishes must be ensured in order for the joint to have good mechanical properties.

In order to achieve the required quality levels, both in wet joint solutions and dry joint solutions, but particularly in the case of the latter, high-precision moulds are required. To this end, the moulds are generally very rigid, as a large amount of material is used in the manufacture thereof in order to avoid deformations due to the weight of the concrete itself or to any other cause, in such a manner that the cost of the mould is very high. Also, the upper and lower flanks are delimited by side walls rigidly joined to the base or countermould of the moulds, due to which any deformation of the mould affects the orientation of the flanks.

By way of alternative, patent application WO2011/157659 A1 discloses a solution for achieving the required degree of precision that consists of mechanically rectifying the flanks of each section once manufactured. This additional process represents a cost overrun for the section.

An intermediate solution consists of applying on the upper flank of the lower section a layer of a high-viscosity joining material, such as resin or mortar, prior to carrying out the butt joint of the upper section. In this manner, the joining material fills any remaining spaces between the two flanks and dispenses with the need for formwork; however, this also requires extremely narrow section manufacturing tolerances.

DESCRIPTION OF THE INVENTION

This invention resolves the previously expounded technical problems by means of a mould for precast concrete element production in which the relative position of the side walls that define the upper and lower flanks of the precast concrete element is defined by elements that are independent from the rest of the mould.

The mould for producing the precast concrete element comprises a base, a countermould and at least two side walls that define a mould cavity, where the side walls define the flanks of the precast prefabricated element that will be formed in the mould cavity, and where the side walls are disposed between the base and the countermould, a first part of the contour of the side walls being opposed to the base and a second part of the contour of the side walls being opposed to the countermould.

The mould also comprises openings that allow pouring of the concrete in the interior of the mould. These openings may be disposed in the countermould, in the base or may be defined by the space existing between the base and the countermould. During the pouring operation, the openings are in the highest position of the mould.

The mould also comprises means for positioning the side walls that are independent from the base and the countermould to reference the side walls therebetween during manufacturing of the precast concrete element, in such a manner that said side walls maintain their relative positions during the precast concrete element manufacturing process, despite the fact that the base may become deformed during the manufacturing process. Therefore, the flanks of the precast concrete element will maintain their parallelism therebetween and the perpendicularity with the axis that defines the conicity of the precast concrete element regardless of the deformations of the mould or the deviations that could occur during the manufacturing process.

Therefore, the mould of the present invention allows obtainment of precast concrete elements having tolerances that allows simplifying and expediting the concrete tower assembly process without the need for using highly rigid and expensive moulds to maintain the positions between the surfaces that define the upper and lower flanks.

The positioning means determine distances between several pairs of points, where each point of a pair of points is disposed on one of the side walls.

In particular, the distances between the pairs of points where each point of a pair of points is disposed on one of the side walls are such that the side walls are disposed substantially parallel therebetween.

More particularly, the positioning means determine the distance between the planes defined by the side walls.

The side walls are disposed in the interior of the mould cavity in such a manner that there is clearance between the side walls and between the base and the countermould. This clearance is sealed by at least one seal disposed adjacent to the contour of the side walls which is comprised in the space defined by the clearance to prevent the concrete from leaking therethrough when pouring.

In this manner, the relative position of the side walls may vary with respect to the base and countermould due to the fact that they lean thereupon by means of the seal(s), but their movement is not restricted with respect to said base and countermould.

The countermould also comprises support elements configured so that, on removing the countermould, the support elements come into contact with part of the positioning means and the positioning elements are removed from the mould together with the countermould. Likewise, the structure of the base comprises support elements configured to receive part of the positioning means when the side walls are removed.

The invention also relates to the manufacturing process that uses the previously described mould for precast concrete element production, which comprises the following stages:

disposing side walls on the base of a mould;

disposing a countermould on the assembly formed by the base and the side walls.

disposing and fixing side wall positioning means; and concrete pouring.

In the third stage of the process the distances between several pair of points are determined, where each point of a pair of points is disposed on one of the side walls.

Specifically, in the third stage the side walls are disposed substantially parallel therebetween due to the fact that the distances between the pairs of points, where each point is disposed on a pair of points on one of the side walls, said distances being determined by the means positioned, are such that the side walls are disposed substantially parallel therebetween.

More specifically, in the third stage the relative position between the side walls is determined, said relative position being subject to the distance between a point contained in one of the side walls and a point contained in another side wall is the same as the distance between the planes defined by the side walls.

The precast concrete element produced in accordance with the process that uses the previously described mould can be used in the construction of a wind turbine that comprises a tower which in turn comprises at least two concrete sections, at least one of which comprises at least one of the previously described precast concrete elements. Both the precast concrete element and the wind turbine are also objects of the invention.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

PREFERRED EMBODIMENT OF THE INVENTION

In light of the aforementioned FIGS. 1 to 6, following is a detailed description of several embodiments of the mould for precast concrete element production of the present invention.

Figure 1:
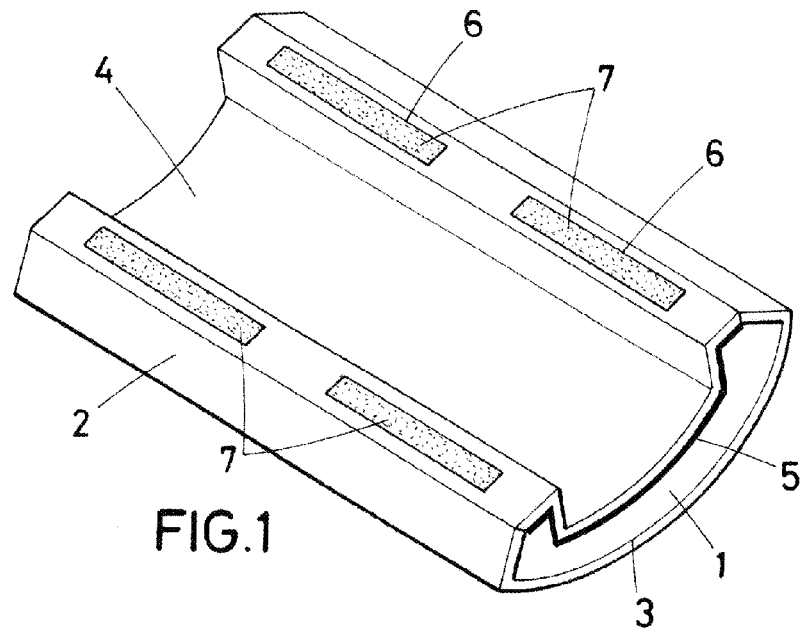
FIG. 1 shows a perspective view of a mould for precast concrete element production of the current state of art.

FIG. 1 shows an embodiment according to the state of the art where, in the assembly process of the mould prior to pouring the concrete, the side walls (1) that will define the flanks of the precast concrete element are rigidly joined to the base (2) of the mould in an adequate position both with respect to the base and therebetween. This has the disadvantage that, once the concrete has been poured, the ensuing forces could cause deformations in the base of the mould, whereupon the position of the side walls would no longer be adequate and the parallelism between the flanks would be lost.

Figure 2:
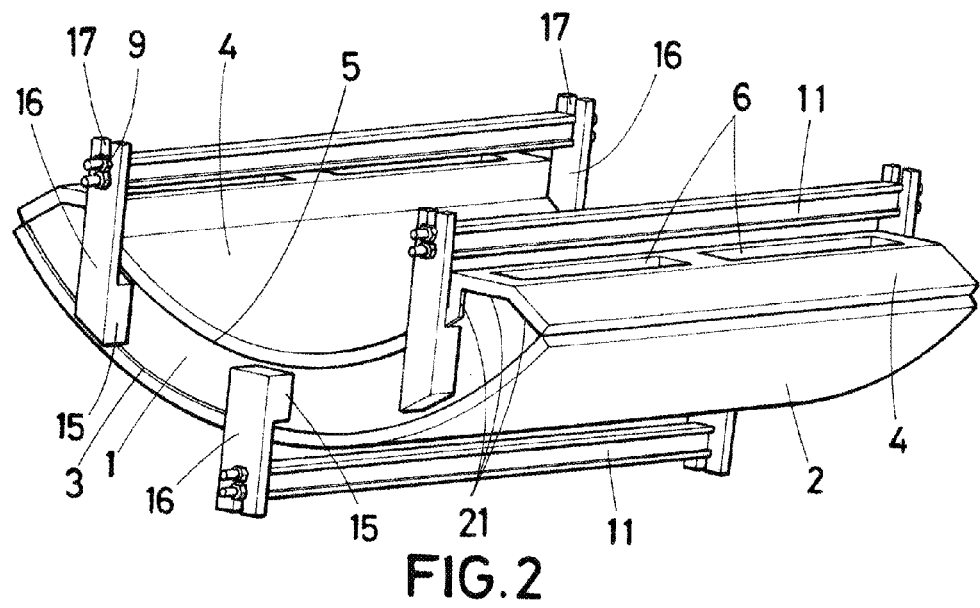
FIG. 2 shows a perspective view of a mould for precast concrete element production of the present invention according to a first embodiment.
Figure 3:
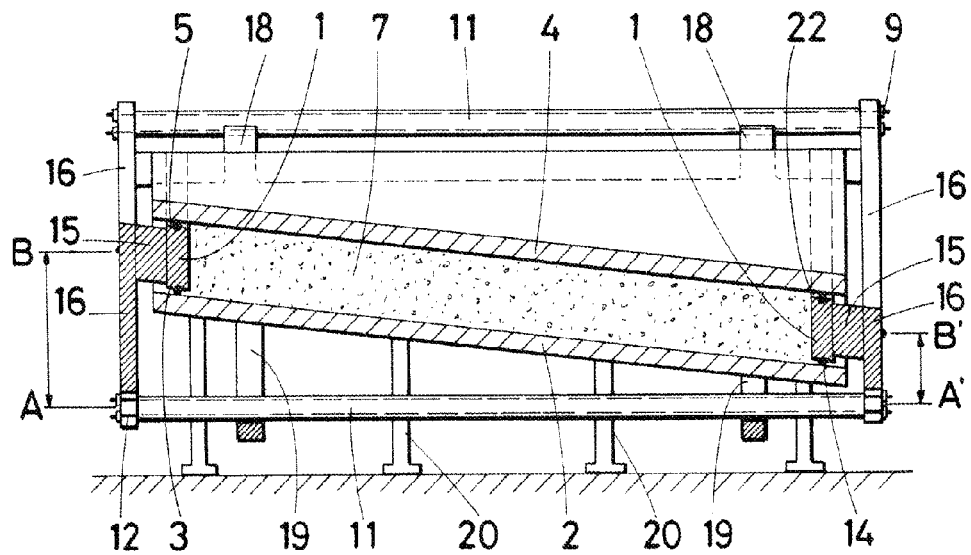
FIG. 3 shows a sectional view of the mould of FIG. 2 where the support elements and support elements not represented in FIG. 2 are represented.

In a first embodiment shown in FIGS. 2 and 3, the mould for precast concrete element production comprises a base (2), a countermould (4) and side walls (1) that define the upper and lower flanks of the precast concrete element formed in the mould cavity, where the side walls (1) are disposed between the base (2) and the countermould (4), a first part (3) of the contour of the side walls (1) being opposed to the base (2) and a second part (5, 21) of the contour of the side walls being opposed to the countermould (4).

In this embodiment, the first part (3) of the contour of the side walls (1) opposed to the base (2) comprises a lower curved edge (3) and the second part of the contour (5, 21) of the side walls opposed to the countermould (4) comprises an upper curved contour (5) and several adjacent straight edges (21).

The mould also comprises openings (6) which allow pouring of the concrete (7) in the interior of the mould. These openings (6) are located in the countermould (4), in such a manner that they are arranged in the highest position of the mould during the production of the precast concrete element.

The mould also comprises positioning means (8, 9, 10, 11, 12) of the side walls (1), which are independent from the base (2) and the countermould (4).

In this first embodiment, first positioning means (9, 11, 12) are disposed which comprise beams (11) having threaded bolts (12) at their ends and fixing nuts (9) threaded onto the threaded bolts (12).

The side walls (1) are disposed in the interior of the mould cavity in such a manner that there is clearance (22) between the side walls (1) and between the base (2) and the countermoulds (4), which is sealed by means of at least one seal (14) disposed on the contour (3, 5, 21) of the side walls (1) between the base (2) and the countermould (4) to prevent the concrete from leaking therethrough when pouring.

Preferably, as observed in FIGS. 2 and 3, the two side walls (1) have first protrusions (15) that extend outwards from the mould cavity in a substantially longitudinal direction of the precast concrete element and second protrusions (16) joined to the first protrusions (15) that extend in a direction substantially parallel to the side walls (1).

The first positioning means (9, 11, 12) are fixed to the side walls (1) in the second protrusions (16), in such a manner that the beams (11) of the first positioning means (9, 11, 12) remain outside of the mould cavity. Preferably, the positioning means thus constituted comprise at least three beams (11) that connect the side walls (1) therebetween through the second protrusions (16), determining the position between three non-aligned points of each of said side walls (1).

The beams (11) are housed in housings (17) consisting of grooves which adopt a substantially vertical direction when pouring the concrete (7) that will be present in the second protrusions (16) of the side walls (1).

In this embodiment, the second protrusions (16) of each side wall (1) are disposed butting against the ends of the beams (11), subsequent to which the fixing nuts (9) are threaded onto the threaded bolts (12) at the ends of the beams, thus determining the length of the beams (11), the distance between a point of a side wall (1) and another point of the opposite side wall (1).

Alternatively, the distance between two points, where each point is disposed on each side wall, is determined by means of two fixing nuts for at least one of the points. In this case, one of the second protrusions (16) of one of the side walls is disposed butting against an end of the beam (11) and is fixed by means of the fixing nut (9) corresponding to the threaded bolt (12), afterwards, on the opposite threaded bolt (12) is disposed a fixing nut (9) that will determine the desired distance between the side walls; next, the second protrusion (16) of the opposite side wall is disposed and, finally, is fixed to the beam (11) by means of the a second fixing nut (9) corresponding to the threaded bolt (12).

In the first example of embodiment, the beams (11) are disposed in a position substantially horizontal and parallel therebetween, and the second protrusions (16) in a manner perpendicular to the beams (11), subsequently disposing three fixing nuts (9) for each of the side walls (1) and another three fixing nuts for the other side walls (1), the fixing nut (9) being disposed therebetween at the same distance. This will ensure that the flanks of the precast concrete element that will define the side walls (1) are parallel and substantially vertical.

In this embodiment, the beams (11) are disposed in such a manner that the distance between the centre of curvature of the lower curved edge (3) of a side wall (1) and the centre of curvature of the lower curved edge (3) of the opposed side wall (1) is equal to the distance between the planes defined by each of the side walls (1), in such a manner that the precast concrete element is a truncated-cone section. To this end, as observed in FIG. 3, where the beams (11) are substantially horizontal and parallel therebetween, the ratio between the distance (distance AB) between the point of one of the second protrusions (16) of one of the side walls (1) where it is fixed to the beam (point A) and the projection of the central point of the side wall in the second protrusion (point B) and the corresponding distance in the opposite side wall (distance A'B') is determined by the conicity pursued for the resulting precast concrete element. Therefore, if the conicity of the truncated cone to be manufactured by the resulting precast concrete element is defined by the ratio 1:k, where:

$$k=(D-d)/l$$

D is the major diameter of the truncated cone, d is the minor diameter and l is the length or height pursued, the following must be fulfilled:

$$2*(AB-A'B')=D-d$$

Alternatively, in order to manufacture a straight cylinder or prism section, the beams (11) are disposed so that the distance between the centre of the lower curved edge (3) of a side wall (1) and the centre of the lower curved edge (3) of the opposite side wall (1) is equal to the distance between the planes defined by each of the side walls (1).

The base (2) also comprises support elements (20) that support the mould assembly.

The beams (11) described in this first preferred embodiment may be substituted by rods (8) such as those described below for the second embodiment.

Figure 4:
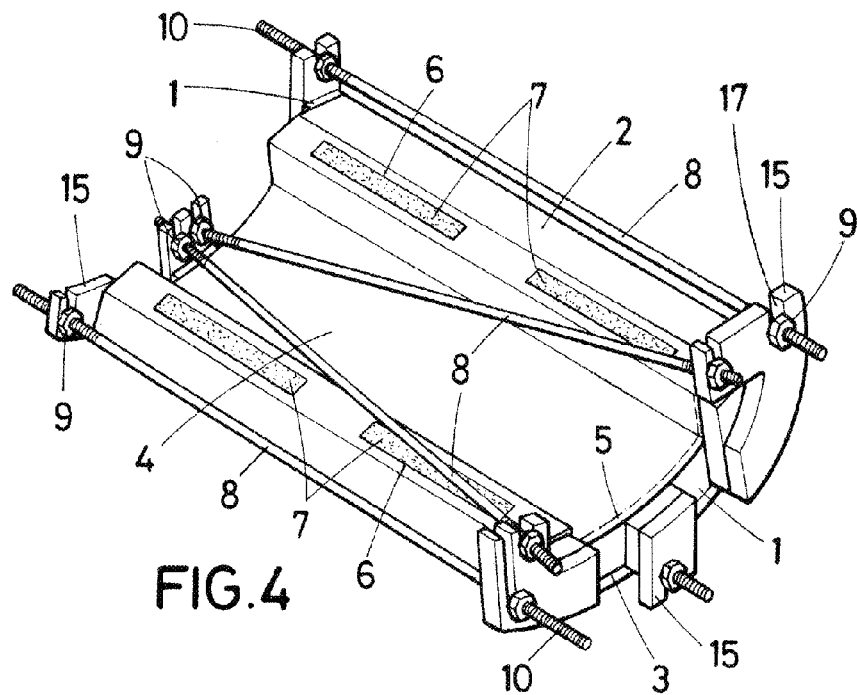
FIG. 4 shows a perspective view of a mould for precast concrete element production of the present invention according to a second embodiment.

In said second embodiment shown in FIG. 4, second positioning means (8, 9, 10) are disposed which comprise rods (8) and fixing nuts (9) threaded onto their ends (10), in such a manner that the fixing nuts (9) are threaded or unthreaded on the rods (8) in order to dispose the side walls (1) parallel therebetween, at a distance that will define the distance between the plane defined by the upper flank and the plane defined by the lower flank of the precast concrete element obtained after removing the precast concrete element from the mould.

In this preferred embodiment at least one of the rods (8) is disposed obliquely to the rest of the rods (8) in the event of being designed to support only traction and compression stress.

In this second embodiment, the mould comprises the first protrusions (15) and second protrusions (16) such as those described in the first embodiment.

Likewise, the countermould (4) has first support elements (18), represented in FIG. 3, configured in such a manner that on uncoupling the fixing nuts (9) and removing the countermould (4) during the unmoulding operation, the first support elements (18) come into contact with at least one beam (11) or rod (8) of the positioning means (8, 9, 10, 11, 12) disposed on the upper part of the countermould (4) and said positioning means (8, 9, 10, 11, 12) are removed from the mould together with the countermould (4). Similarly, the structure of the base (2) may have, alternatively or in addition to the first support elements (18) of the countermould (4), second support elements (19) configured in such a manner that on uncoupling the fixing nuts (9) during the unmoulding operation, the second support elements (19) come into contact with at least one beam (11) or a rod (8) of the positioning means (8, 9, 10, 11, 12) disposed on the lower part of the mould (4), in such a manner that the positioning means (8, 9, 10, 11, 12) remain on the support means (19) during unmoulding of the precast concrete element and subsequent assembly of the mould for producing the next precast concrete element. This will facilitate handling and assembly of the positioning means.

Figure 5:
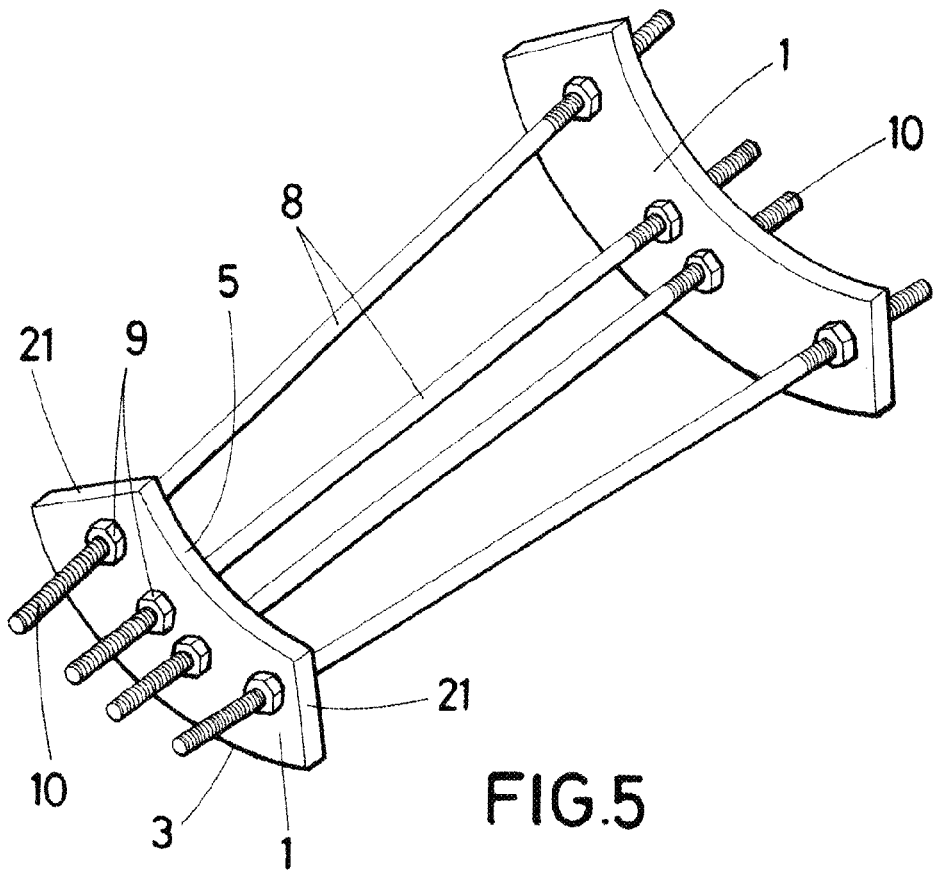
FIG. 5 shows a sectional view of a mould for precast concrete element production of the present invention according to a third embodiment.
Figure 6:
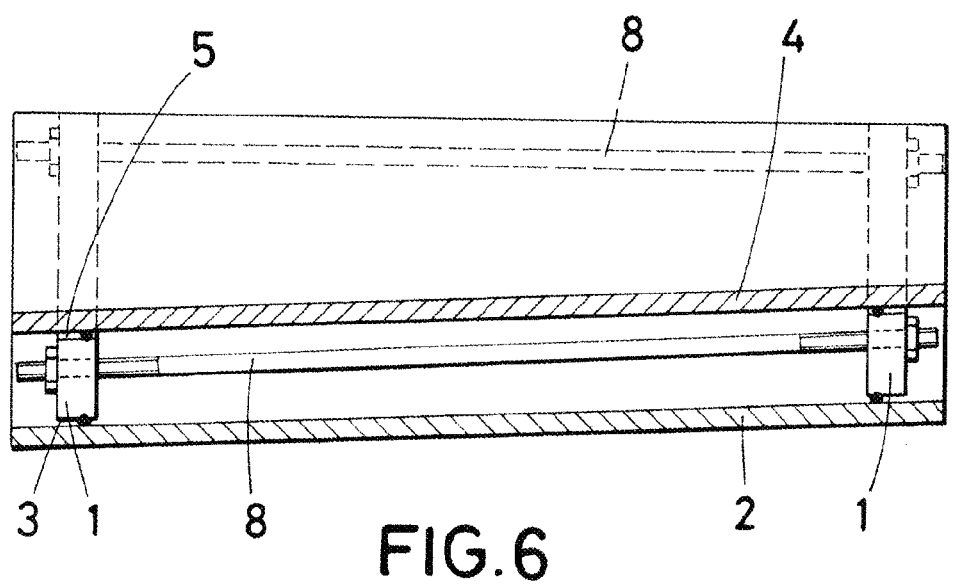
FIG. 6 shows a perspective view of the assembly formed by the side walls and the positioning means of the embodiment represented in FIG. 5.

In a third embodiment shown in FIGS. 5 and 6, at least one of the rods (8) of the positioning means is partially disposed in the interior of the mould cavity, in such a manner that once the concrete (7) is poured into the interior of the mould, the rod (8) forms part of the armour of the precast concrete element.

In this third embodiment, at least one of the side walls (1) forms an integral part of the precast concrete element once it is unmoulded, acting as a flange or reinforcement thereof, where at least one of the side walls (1) does not have protrusions (15, 16) such as those described for the two preceding embodiments.

The invention also relates to the manufacturing process that uses the previously described mould for precast concrete element production of the first embodiment and which comprises the following stages:
disposing the side walls (1) on the base (2) of the mould;
disposing the countermould (4) together with part of the positioning means (9, 11, 12) on the assembly formed by the base and the side walls (1);
disposing the rest of the positioning means (9, 11, 12) and fixing of the positioning means (9, 11, 12) of the side walls (1); and
pouring the concrete (7).

The manufacturing process also comprises the following stages:
disassembling the positioning means (9, 10, 12);
removing the countermould (4) together with part of the positioning means (11);
removing the side walls (1); and
unmoulding the precast concrete element or nacelle, after the concrete pouring (7) stage.

The invention claimed is:

1. A mould for precast concrete element production comprising:
a base,
a countermould, and
at least two side walls comprising an edge that surrounds the side wall that define a mould cavity, where the side walls are configured to define flanks of the precast concrete element that is formed inside the mould cavity, and
where at least a portion of the side walls is disposed between the base and the countermould, a first part of the edge of the side walls being opposed to the base and a second part of the edge of the side walls being opposed to the countermould, and
wherein the mould also comprises positioning means further comprising longitudinal elements that connect the side walls therebetween, said positioning means being independent from the base and the countermould, and said positioning means are configured to determine the distances between at least a pair of points, where each point of the at least a pair of points is disposed on one of the side walls, wherein the relative position of the side walls with respect to the base and countermould may vary during the production of the precast concrete element.

2. Mould according to claim 1, wherein the positioning means determine the distances between at least three pairs of points, where each point of each of the at least three pairs of points is disposed on one of the side walls and the side walls are disposed substantially parallel therebetween.

3. Mould according to claim 2, wherein each side wall defines a plane and wherein the positioning means are configured to determine the distance between the planes defined by the side walls.

4. Mould according to claim 1, wherein there is clearance between the edge of the side walls and the base and the countermould.

5. Mould according to claim 1, wherein the side walls have first protrusions that extend outside of the mould cavity in a substantially longitudinal direction of the precast concrete element and second protrusions joined to the first protrusions that extend in a direction substantially parallel to the side walls.

6. Mould according to claim 5, wherein the positioning means are housed in housings disposed in the second protrusions of the side walls.

7. Mould according to claim 6, wherein the housings disposed in the second protrusions of the side walls consist of grooves that adopt a substantially vertical direction during production of the precast concrete element.

8. Mould according to claim 1, wherein the positioning means comprise beams with threaded bolts on their ends for threading fixing nuts.

9. Mould according to claim 8, wherein the positioning means comprise at least three beams that connect the side walls therebetween, determining the position between three nonaligned points of the surface of each of said side walls.

10. Mould according to claim 1, wherein the positioning means comprise rods and fixing nuts threaded onto their ends.

11. Mould according to claim 10, wherein at least one of the rods of the positioning means is partially disposed in the interior of the mould cavity.

12. Mould according to claim 4, further comprising at least one seal disposed adjacent to the edge of the side walls comprised in the space defined by the clearance.

13. Mould according to claim 1, wherein the countermould also comprises first support elements configured so that, on removing the countermould, the first support elements come into contact with at least part of the positioning means and are removed from the mould together with the countermould.

14. Mould according to claim 1, wherein the base also comprises second support elements configured to receive part of the positioning means when these are not fixed to the side walls.

15. A manufacturing process for the production of a precast concrete element using a mould for precast concrete element production comprising:
- a base,
- a countermould, and
- at least two side walls comprising an edge that surrounds the side wall that define a mould cavity, where the side walls are configured to define flanks of the precast concrete element that is formed inside the mould cavity, and
- where at least a portion of the side walls is disposed between the base and the countermould, a first part of the edge of the side walls being opposed to the base and a second part of the edge of the side walls being opposed to the countermould, and
- wherein the mould also comprises positioning means further comprising longitudinal elements that connect the side walls therebetween, said positioning means being independent from the base and the countermould, and said positioning means are configured to determine the distances between at least a pair of points, where each point of the at least a pair of points is disposed on one of the side walls, wherein the relative position of the side walls with respect to the base and countermould may vary during the production of the precast concrete element,
- wherein the manufacturing process comprises the following stages:
  - disposing side walls on a base of the mould;
  - disposing a countermould on the assembly formed by the base and the side walls;
  - disposing and fixing positioning means of the side walls; and
  - pouring the concrete.

16. Manufacturing process, according to claim 15, wherein in the stage of disposing and fixing positioning means of the side walls, the distances between several pairs of points are determined, where each point of a pair of points is disposed on one of the side walls.

17. Manufacturing process, according to claim 16, further comprising the following stages:
- disassembling the positioning means;
- removing the countermould;
- removing the side walls; and
- unmoulding the precast concrete element or nacelle;
- after the concrete pouring stage.

* * * * *